US006867562B2

(12) United States Patent
Weiner et al.

(10) Patent No.: US 6,867,562 B2
(45) Date of Patent: Mar. 15, 2005

(54) CONTROL SYSTEM AND METHOD FOR MOVEMENT OF WINDOW PANES IN CONVERTIBLES

(75) Inventors: Hans Weiner, Muehlacker (DE); Bernhard Ritter, Pforzheim (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/388,603

(22) Filed: Mar. 17, 2003

(65) Prior Publication Data

US 2004/0027080 A1 Feb. 12, 2004

(30) Foreign Application Priority Data

Mar. 16, 2002 (DE) ........................................ 102 11 783

(51) Int. Cl.[7] ................................................ H02P 1/00

(52) U.S. Cl. ........................ 318/264; 318/266; 318/445; 318/466

(58) Field of Search ................................ 318/266, 445, 318/466, 468, 264; 249/117

(56) References Cited

U.S. PATENT DOCUMENTS 2,253,805 A 8/1941 Olivier
3,659,381 A * 5/1972 Frey et al. .................... 49/103
5,110,175 A * 5/1992 Fischbach .................. 296/117
6,054,821 A 4/2000 Koch et al. ................ 318/266

FOREIGN PATENT DOCUMENTS

| | | |
|---|---|---|
| DE | 1069494 | 11/1959 |
| DE | 42 05 286 | 8/1993 |
| DE | 42 33 775 | 2/1994 |
| DE | 4233775 | 2/1994 |
| DE | 43 25 501 | 2/1995 |
| DE | 197 47 326 | 5/1999 |
| DE | 10113318 | 8/2002 |

* cited by examiner

*Primary Examiner*—Karen Masih
(74) *Attorney, Agent, or Firm*—Crowell & Moring LLP

(57) ABSTRACT

Vehicle window panes for a convertible including a door window pane and a rear window pane which adjoin one another at a joint pane boundary line. When the door window pane is closed, the rear window pane may be in the open or closed end position and, when the door window pane is partially or completely lowered, the rear window pane is in an open position in every case.

20 Claims, 1 Drawing Sheet

CONTROL SYSTEM AND METHOD FOR MOVEMENT OF WINDOW PANES IN CONVERTIBLES

This application claims the priority of German Application No. 102 117 83.7 filed Mar. 16, 2002, the disclosure of which is expressly incorporated by reference herein.

BACKGROUND AND SUMMARY OF THE INVENTION

The invention relates to the control of the window panes in motor vehicles in which the windows have no frames. Such frameless window panes have the problem that, in the closed condition, the window pane has to be disposed in the door seal with a good fit and, when the window panes are opened, no edges or corners should be formed which may cause injuries.

German Patent Document DE 42 33 775 A1, a method of operating two drives for vehicle window panes is known, a window pane and a rear window pane each being separately movable by a drive, and the two panes adjoining one another at a pane boundary line without an additional window frame. When one of the panes is driven, the second pane, for avoiding friction losses, also is to be brought into a receded position by an activating of the second drive.

The problem of controlling the panes is even increased in the case of convertibles. Particularly when the folding top is lowered, it is critical here that only the front pane be lowered and the possibly existing rear part of the side pane be left standing. Solutions are known in which this rear window pane is brought into a correspondingly folded-away position directly with the opening of the convertible top. However, in some cases, particularly when passengers are seated in the rear area, it is desirable to let this window pane stand in order to avoid unnecessary discomfort caused by wind.

The arrangement and control of the rear window pane of a motor vehicle according to the invention has the advantage that, on the one hand, the discomfort to the passenger caused by wind is minimized, and, on the other hand, the risk of injury is reduced.

When the convertible top is open, the control according to the invention causes a lowering of the rear window pane in a restrictedly controlled manner during the lowering of the front window pane of the motor vehicle. This restricted control has the effect that the opening and closing of the rear window pane will not be forgotten but that the latter will always be brought into the correct position by being coupled to the operation of the front window pane.

Other objects, advantages and novel features of the present invention will become apparent from the following detailed description of the invention when considered in conjunction with the accompanying drawings.

DETAILED DESCRIPTION OF THE DRAWINGS

Figure 1:
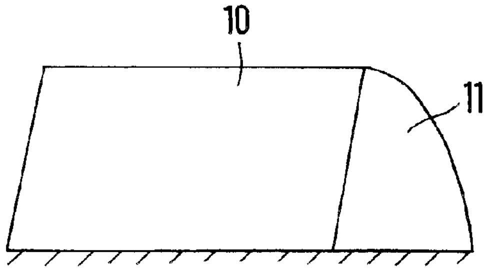
FIG. 1 is a schematic view of a door window pane with a rear window pane in the closed condition.

As an overview, FIG. 1 shows the door window pane 10 and the rear window pane 11, each in the closed condition.

It is very clearly shown here that the door window pane 10 is arranged at the same height as the rear window pane 11.

Figure 2:
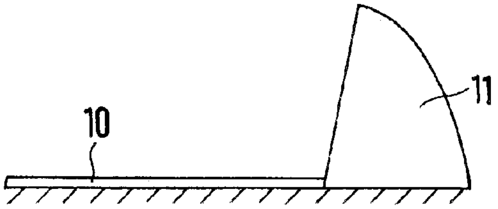
FIG. 2 is a view of a door window pane with the rear window pane, the door window pane being open and the rear window pane being closed.

In contrast, FIG. 2 shows that the door window pane 10 is lowered, while the rear window pane 11 is still in the closed condition. This arrangement is not desirable particularly when the top of a convertible is open because it may easily be overlooked as a result of its framelessness and therefore represents a risk of injury.

Figure 3:
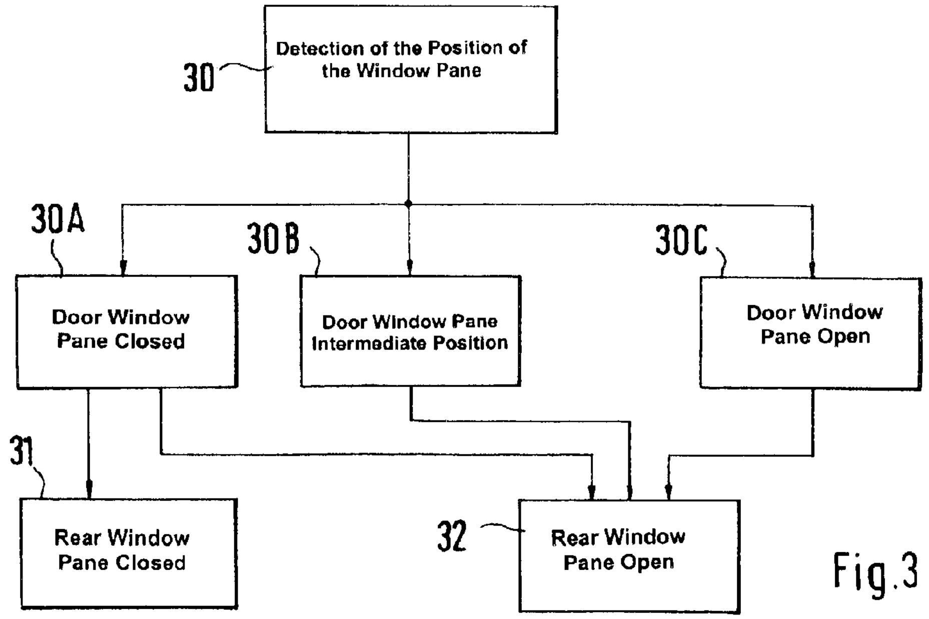
FIG. 3 is a view of the conditions for the positions of the rear window pane as a function of the position or movement control of the door window pane.

FIG. 3 is a combined overview of the conditions for the positions of the rear window pane as a function of the position or the movement control of the door window pane.

The door window pane can take up three positions. These are the closed position 30A; the intermediate position 30B; or the open position 30C. Based on these three defined positions, two positions are permissible for the rear window pane, generally, an intermediate position being prohibited for the rear window pane. Possible positions are: Rear window pane closed 31 or rear window pane open 32.

It is illustrated that in positions 30B—door window pane in the intermediate position—and 30C—door window pane open—, the rear window pane has to be brought into the completely open position—rear window pane open 32. When the door window pane is closed, the rear window pane may be between the end positions—rear window pane open 32—and—rear window pane closed 31.

Because of the definition of the positions to be taken up by the rear window pane, different movements are controlled in a restricted manner.

If, for example, after an operation of the rear window pane while the door pane is completely closed, the operation takes place from one of the two end positions and if this operation is interrupted before the end position has been reached, the rear pane will automatically always move into an open position 32. If the door window panes and the rear window panes are completely closed and the door window pane is partially lowered, the rear window pane will automatically move into the open position as soon as the door window pane leaves the upper end position.

Another restricted control takes place when the rear window pane is to be closed and the door window pane is in an only partially closed or open position. After an operation of the "close rear window pane" key, first, the door window pane will be moved into the closed position 30A and subsequently the rear window pane will be moved into the closed position 31.

In contrast, in the case of a vehicle with a closed top, each of the two panes can be moved into any position independently of the other.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling movement of vehicle window panes for a convertible motor vehicle where the vehicle window panes include a door window pane and a rear window pane which adjoin one another at a joint pane boundary line and are separately movable, comprising:

always bringing the rear window to a completely open position when a convertible top of the motor vehicle is open and the door window pane is partially or completely lowered, and permitting the rear window pane to be in the completely open position as well as a closed end position when the rear window pane is closed.

2. A method according to claim 1, and further comprising first moving the door window pane into a closed position and subsequently moving the rear window pane into the closed end position after operation of the rear window pane for closing.

3. A method according to claim 1, wherein when the door window pane is operated to open during a movement of the rear window pane, a momentary movement of the rear window pane is interrupted and the rear window pane is moved into an open position.

4. A method according to claim 2, wherein when the door window pane is operated to open during a movement of the rear window pane, a momentary movement of the rear window pane is interrupted and the rear window pane is moved into an open position.

5. A method of operating a window pane assembly of a convertible, which window pane assembly includes a first window pane and a second window pane which adjoin one another at a joint bounding line and are separately movable, said method comprising controlling the window panes with an open convertible top such that the second window pane is always in a substantially completely open end position when the first window pane is moved away from its closed position.

6. A method according to claim 5, said method further comprising with an open convertible top, permitting free movement of the second window pane between its closed and open positions when the first window pane is in its completely closed position.

7. A method according to claim 5, wherein the first window pane is in front of the second window pane with respect to a front driving direction of the vehicle.

8. A method according to claim 5, wherein said first window pane is a door window pane and the second window pane is a rear window pane.

9. A method according to claim 8, wherein based on an open rear window and door window pane, after the operation of the rear window pane, for the closing, first the door window pane is moved into a closed position and subsequently the rear window pane is moved into the closed position.

10. A method according to claim 8, wherein when the door window pane is operated for the opening during a movement of the rear window pane, the momentary movement of the rear window pane is interrupted and the rear window pane is moved into an open position.

11. A method according to claim 9, wherein when the door window pane is operated for the opening during a movement of the rear window pane, the momentary movement of the rear window pane is interrupted and the rear window pane is moved into an open position.

12. A method according to claim 6, comprising permitting free independent movement of the window panes with a closed convertible top.

13. A convertible vehicle window pane assembly comprising:

a first window pane and a second window pane which adjoin one another in use at a side of vehicle along a joint boundary line when in respective window closed positions, and a window pane control system operable to control movement of the window panes with an open convertible top such that the second window pane is always in a substantially completely open end position when the first window pane is moved away from its closed position.

14. A convertible vehicle window pane assembly according to claim 13, wherein said window pane control system is operable with an open convertible top to permit free movement of the second window pane between its closed and open positions when the first window pane is in its completely closed position.

15. A convertible vehicle window pane assembly according to claim 13, wherein said first window pane is a side door mounted window pane and said second window pane is a rear window pane disposed rearwardly of the side door mounted window pane.

16. A convertible vehicle window pane assembly according to claim 14, wherein said first window pane is a side door mounted window pane and said second window pane is a rear window pane disposed rearwardly of the side door mounted window pane.

17. A convertible vehicle window pane assembly according to claim 13, wherein the first window pane is in front of the second window pane with respect to a front driving direction of the vehicle.

18. A convertible vehicle window pane assembly according to claim 14, wherein said window pane control system is operable such that, based on an open rear window and door window pane, after the operation of the rear window pane, for the closing, first the door window pane is moved into a closed position and subsequently the rear window pane is moved into the closed position.

19. A convertible vehicle window pane assembly according to claim 18, wherein said window pane control system is operable such that, when the door window pane is operated for the opening during a movement of the rear window pane, the momentary movement of the rear window pane is interrupted and the rear window pane is moved into an open position.

20. A convertible vehicle window pane assembly according to claim 14, wherein said window pane control system is operable to provide independent opening and closing movements of the first and second window panes with a closed convertible top.

* * * * *